July 25, 1944.  C. C. SCHUETZ  2,354,350
COATED STRUCTURAL MATERIAL
Filed Nov. 18, 1939
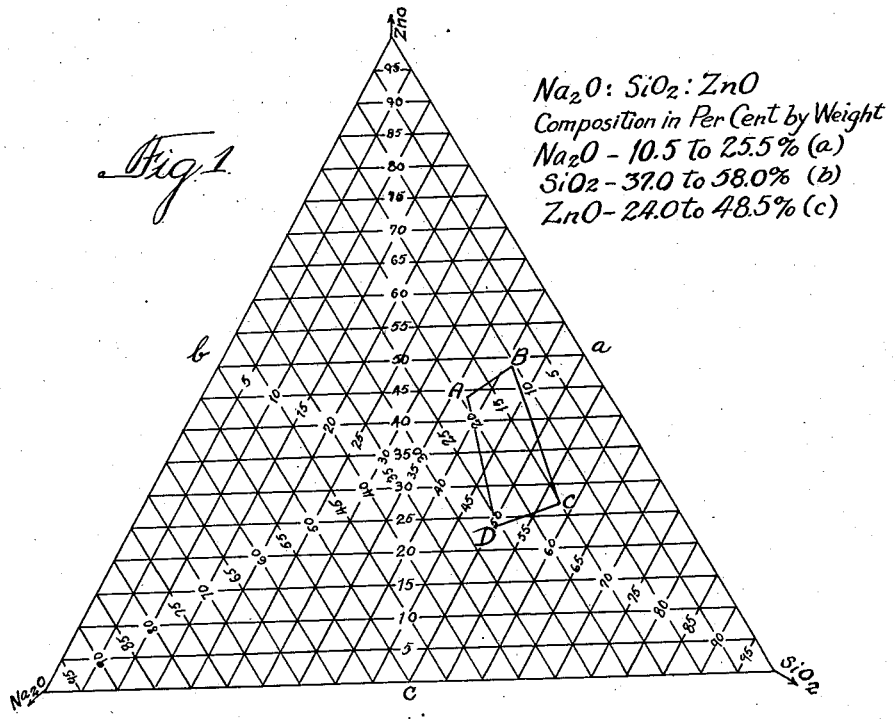
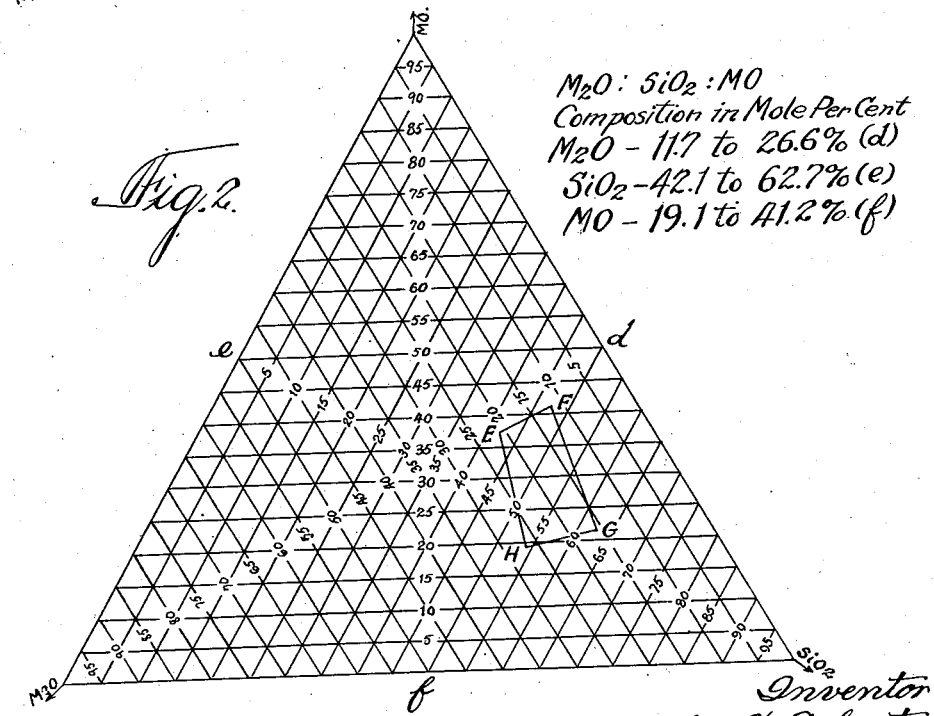
Inventor
Clyde C. Schuetz
By Amer, Phiess, Olsen & Mecklenborger, Attys.

Patented July 25, 1944

2,354,350

UNITED STATES PATENT OFFICE 2,354,350

COATED STRUCTURAL MATERIAL

Clyde C. Schuetz, Chicago, Ill., assignor to United States Gypsum Company, Chicago, Ill., a corporation of Illinois Application November 18, 1939, Serial No. 305,124

13 Claims. (Cl. 117—126)

This invention relates to an inorganic coating composition suitable for use on structural materials such as cementitious materials, stone, clay bodies and the like, and to a method for rendering it hard and weather-resistant.

Certain cementitious materials such as asbestos cement shingles, as they are now prepared, have highly porous and absorptive surfaces which readily lend themselves to the collection of dirt and stains, particularly when exposed to the weather, and hence are very difficult to clean. Cementitious substances when exposed to air and water also have a tendency to "bloom" after a period of time. This so-called "blooming" is presumably the result of migration of dissolved calcium hydroxide to the surface during drying of the material, followed by carbonation of the resulting surface deposit of calcium hydroxide as a result of contact with carbon dioxide in the air, the resulting deposit thus being rendered insoluble. This phenomenon is particularly undesirable in asbestos cement shingles as they are now prepared according to the methods well known to the art. It is consequently desirable that a paint be provided which may be readily and economically sprayed or painted upon the surfaces of such materials in order to render them more readily washable and further to protect them from the influence of the weather.

Furthermore, it is often desirable to produce asbestos shingles and certain other cementitious materials in a large variety of colors. In the past this has been done primarily by incorporating pigments directly into the mixture previous to the formation of the mass from which the shingles are formed. This procedure has not been entirely satisfactory, since the color desired must be chosen at the time of manufacture of the material, and consequently it has been necessary for manufacturers of articles of this kind to maintain large stocks in order to provide a readily available source of varied colored materials for their individual customers. The requirements must be anticipated for a sufficient time to allow the cement to cure, usually twenty-eight days. The use of my coating permits curing of only one neutrally colored sheet, which can then be covered with a coating of any desired color in a few hours in accordance with my process. Some manufacturers have attempted to use paints with an organic vehicle, but the life of such coatings was not satisfactory.

An object of this invention, therefore, is to provide a coating composition which may be readily applied to porous surfaces, such as asbestos cement shingles, clay tile and the like, and which will provide a hard, weather-resistant surface which, when produced by my process, may be readily cleaned.

A further object of this invention is to provide a paint, which may be produced in a variety of colors, for application to the surface of cementitious material.

Another object is to provide a process for rendering the coating hard and weather-resistant and to overcome some of the difficulties in producing a satisfactory coating which have been ignored by prior art.

Other objects will become apparent from the following description and the appended claims.

It is proposed in accordance with this invention to provide a coating material for the purposes described which may be prepared from a soluble alkali metal silicate solution and a compound that will react therewith to form an insoluble silicate. In accordance with one preferred embodiment of this invention, a sodium silicate solution may be mixed with zinc oxide and water to produce a paint of the desired consistency. Pigments and fillers may be incorporated if desired. The resulting paint may be brushed or sprayed onto the surface of the material, such as, for example, an asbestos cement shingle, and the coating allowed to dry.

A suitable coating composition for the practice of the present invention may be prepared in accordance with the following examples:

Example I

The following ingredients are mixed together in any desired manner and blended in a high-speed mixer:

|  | Parts by weight |
|---|---|
| Sodium silicate (40° Bé.; sodium oxide to silica ratio 1 $Na_2O:3.22\ SiO_2$) | 60.0 |
| Zinc oxide | 15.2 |
| Water | 15.0 |
| Suitable filler | 5.8 |
| Pigment | 4.0 |

After thorough mixing, the resulting mass may be passed through a burr mill or other suitable paint mill. It is preferable, when employing a plate-like filler such as mica, that it and a part of water be mixed in after the other materials have passed through the paint mill. The paint mill functions primarily to break up aggregates of filler and pigment. The resulting mixture is a paint that is ready for use in accordance with the present invention.

Example II

The following ingredients may be compounded in the manner indicated in the previous example:

| | Parts by weight |
|---|---|
| Sodium silicate (40° Bé.; sodium oxide to silica ratio 1 $Na_2O:3.22$ $SiO_2$) | 70.0 |
| Zinc oxide | 13.3 |
| Water | 13.3 |
| Chromium oxide | 3.4 |

The resulting green paint is ready for use and may be applied by brushing or spraying.

It is not intended that this invention be precisely limited to the ratio of soluble silicate to zinc oxide or other reactive materials as has been indicated in the two above examples. It has been found, however, that a very resistant and particularly desirable coating will be produced when the proportions of sodium oxide, silica dioxide, and zinc oxide are within the area shown on the triaxial diagram which appears as Fig. 1 of the drawing and the process described hereinbelow in detail is followed.

I have found that if an excess of sodium oxide above that defined in the outlined area is used, the weather resistance is adversely affected and the coating cannot be made entirely suitable for outdoor exposure. If a deficiency of sodium oxide is present, the results are also unsatisfactory. A deficiency of zinc oxide results in a coating having too high a solubility, while an excess of zinc oxide produces a chalky coat.

The compositions indicated in the triaxial diagram refer to the silica ($SiO_2$) actually added as part of the sodium silica selected. Finely ground silica does not appear materially to enter into the chemical reaction, although in quantities of approximately 6% it causes an improvement in the physical properties of the coating, acting apparently as a filler. In the diagram, Fig. 1, the ratios of $Na_2O$ (base $a$), $SiO_2$ (base $b$) and ZnO (base $c$) are so correlated that at any intersection the total parts of the three ingredients total 100 parts by weight. The area bounded by the lines connecting the points A, B, C and D is that found best suited for the present invention. The limits hence are:

| | Minimum | Maximum |
|---|---|---|
| $Na_2O$ | 10.5 | 25.5 |
| $SiO_2$ | 37 | 58 |
| ZnO | 24 | 48.5 |

In the above tabulation the percentages are by weight.

In addition to the three fundamental ingredients, I also add fillers and pigments, or other coloring matter. For this purpose I prefer to use finely ground water-washed mica or a similar plate-like filler. Other fillers which have given satisfactory results are diatomaceous earth, finely ground slag, talc, ground flaky oyster shell, pyrophyllite, ground vermiculite, finely ground fibrous waste from asbestos, and others possessing like properties.

Limeproof oxide pigments can be used in quantities as required to give the desired color, while other pigments may likewise be used if they are resistant to alkalis.

Water can be used in the quantity required to give a good brushing or spraying consistency, but should be held to the minimum which will give good working qualities. This quantity is substantially that shown in the illustrative examples given previously.

Other reactive components may partially or completely replace the zinc oxide in the coating. Such materials as may be employed to make a usable coating are calcium carbonate, high burned magnesium oxide, or finely ground dolomite. Light burned magnesium oxide, hydrated dolomitic lime, and hydrated high calcium lime have been found in general to react too rapidly with the silicate at ordinary room temperatures, thus causing the paint to gel before application. In general, it has been found that a compound having a solubility product, as defined by chemists, of less than $1.0 \times 10^{-7}$ can be used in my formula and process. I do, however, prefer to use zinc oxide, since it was found that better opacity and hiding power is thus obtained in the coating composition. In any case the silicate solution must react with the second component at the conditions of a baking or heating operation, described below, but must not enter into a rapid reaction at room temperatures. Substitutions for the ZnO, if made, should be in molecular proportions.

As a further disclosure of materials other than zinc oxide, and as a guide in formulating an operative composition based on such other substances, I hereby state that I may employ, for example, a relatively high burned magnesium oxide, MgO, or calcium carbonate. As these materials have different molecular weights than zinc oxide, I have worked out a second triaxial chart on which I have plotted the mole per cent of the three ingredients, namely, the alkali metal oxide, designated according to common chemical usage as $M_2O$, indicating thereby that is monovalent, the $SiO_2$ as before, and the divalent metal oxide as MO. This chart is Fig. 2 of the drawing. The percentages there given are not in per cent by weight but in mole per cent. The alkali metal oxide is on the base $d$ (right slope), the $SiO_2$ on the base $e$ (left slope) and the MO on base $f$ (bottom or base of the triangle). The effective area for the purposes of my present invention is enclosed within the four-sided figure bounded by the lines connecting the points E, F, G and H. Compositions falling outside this area yield results which are not completely satisfactory; and, in general, the further a given composition is removed from this are EFGH, the poorer will be the results. When using zinc oxide and sodium silicate, either Fig. 1 or Fig. 2 can be employed in formulating a suitable paint composition, but when using magnesium oxde, calcium carbonate, or any other equivalent divalent oxide or carbonate, or when using, for example, potassium silicate, Fig. 2 should be employed, remembering that the figures thereon are in mole per cent. In the subjoined example the magnesium oxide found to be particularly suitable was one obtainable from F. E. Schundler & Co., of Chicago, Illinois, under the name of #0 Bald Eagle Calcined Magnesite.

An illustrative example of a suitable composition employing a relatively high burned magnesium oxide in place of the zinc oxide of the previous example is as follows:

| | Percent |
|---|---|
| Sodium silicate: 36.7% solids, Silica ratio 1:3.22 | 74.5 |
| MgO (#0 Bald Eagle Calcined Magnesite from Schundler & Co.) | 9.3 |
| Pigment ($TiO_2$) | 4.6 |
| Fine mica | 7.0 |
| Water | 4.6 |
| | 100.0 |

Solids in reactants in 100 gms. of mix:

| | |
|---|---|
| MgO | 9.30 |
| Sodium silicate (.367×74.5)=27.3 | |
| $Na_2O = \frac{1}{4.22} \times 27.3 =$ | 6.48 |
| $SiO_2 = \frac{3.22}{4.22} \times 27.3 =$ | 20.82 |

Moles of reactants in 100 gms. of mix:

| | |
|---|---|
| $MgO = \frac{9.3}{40.3} =$ | .231 |
| $Na_2O = \frac{6.48}{61.99} =$ | .104 |
| $SiO_2 = \frac{20.82}{60.06} =$ | .347 |
| | .682 |

Mole per cent of reactants:

| | |
|---|---|
| $MgO = \frac{.231}{.682} \times 100 =$ | 33.9 |
| $Na_2O = \frac{.104}{.682} \times 100 =$ | 15.2 |
| $SiO_2 = \frac{.347}{.682} \times 100 =$ | 50.9 |
| | 100.0 |

An illustrative example in which calcium carbonate, $CaCO_3$, is used in place of zinc oxide is as follows:

| | Percent |
|---|---|
| Sodium silicate: 36.7% solids, silica ratio 1:3.22 | 63.2 |
| Precipitated calcium carbonate | 20.4 |
| Pigment (ferrite yellow) | 5.1 |
| Water | 11.3 |
| | 100.0 |

Solids in reactants per 100 gms. of mix:

| | |
|---|---|
| Precipitated calcium carbonate | 20.4 |
| Sodium silicate (.367×63.2)=23.2 | |
| $Na_2O = \frac{1}{4.22} \times 23.2 =$ | 5.5 |
| $SiO_2 = \frac{3.22}{4.22} \times 23.2 =$ | 17.7 |

Moles of reactants per 100 gms. of mix:

| | |
|---|---|
| Calcium carbonate $= \frac{20.4}{100.08} =$ | .204 |
| $Na_2O = \frac{5.5}{61.99} =$ | .089 |
| $SiO_2 = \frac{17.7}{60.06} =$ | .295 |
| | .588 |

Mole per cent of reactants:

| | Percent |
|---|---|
| Calcium carbonate $= \frac{.204}{.588} \times 100 =$ | 34.7 |
| $Na_2O = \frac{.089}{.588} \times 100 =$ | 15.1 |
| $SiO_2 = \frac{.295}{.588} \times 100 =$ | 50.2 |

In the above calculations, the reason for dividing, in case of $Na_2O$, 1 by 4.22 is that, inasmuch as the ratio of the $Na_2O$ to $SiO_2$ in the sodium silicate employed is as 1:3.22, obviously there is a total of 4.22 parts of both of these ingredients, of which the $Na_2O$ is $$\frac{1}{4.22} \text{ and the } SiO_2 \text{ is } \frac{3.22}{4.22}$$

The 23.2 is the figure derived from the actual percentage of solids in the sodium silicate solution employed, namely, 36.7%. As 63.2% of sodium silicate solution was used, then 36.7% thereof is actual sodium silicate, the rest being water. In arriving at the moles of reactants present, the actual weight percentage is divided by the molecular weight of the substance in question. Thus, the molecular weight of $Na_2O$ is 61.99, and therefore one mole thereof is 61.99 grams. As only 5.5% is present, this is $$\frac{5.5}{61.99}$$

of a mole, or 0.089. Adding up the total moles used of the three ingredients, and dividing each by the total and multiplying by 100, this yields the mole per cent. This type of calculation was employed in working out Fig. 2. The limits are also given in tabular form alongside the triangular diagram.

Referring once more to Fig. 1 and the use of zinc oxide and sodium silicate, in determining the limits outlined by the area on the triaxial diagram, sodium silicates having various silica ratios ranging from 1:1.6 to 1:3.9 were used. It was found that with the solid reactant properly adjusted, one could get reasonably satisfactory results in weathering tests with silicates having ratios from substantially 1:2 up to those having ratios of 1:3.9. It will be found that any point on the left line of the area in the triaxial diagram (Fig. 1) on weight relations will represent a condition in which the silica is substantially two times the soda. Any point in the right line represents a condition in which the silica is substantially 3.9 times the soda. The best results were obtained with a silicate having a silica ratio of approximately 1:3.2. Silicates having a ratio higher than 1:3.9 are not ordinarily made, because of their lack of stability. In adjusting the proportions of solid reactant to the sodium silicate, zinc oxide was added in such amounts that the mole relation to $SiO_2$ was:

1 ZnO to 3 $SiO_2$; 1 ZnO to 2 $SiO_2$; 2 ZnO to 3 $SiO_2$; 1 ZnO to 1 $SiO_2$; 3 ZnO to 2 $SiO_2$; and 2 ZnO to 1 $SiO_2$.

Cementitious slabs, such as asbestos-cement shingles were coated with these compositions and subjected to weatherometer tests and outdoor exposure. It was found that the samples low in ZnO tended to lack weather resistance because of the solubility of the coating, while those high in ZnO tended to be chalky and nonwashable. From observation of these samples, a relation of moles of ZnO to moles of $SiO_2$ was arrived at, ranging from essentially 1 mole of ZnO to 3 moles of $SiO_2$, to 1 mole of ZnO to 1 mole of $SiO_2$. Actually, the relation of 1 mole of ZnO to 3 moles of $SiO_2$ was borderline in respect to solubility. The relation of 1 mole of ZnO to 1 mole of $SiO_2$ was borderline with respect to chalkiness. It will be found that the upper line of the chart gives mole fractions representing points having substantially a relation of 1 mole ZnO to 1.15 moles of $SiO_2$. The lower line represents points having substantially the relation of 1 mole ZnO to 2.85 moles of $SiO_2$. Therefore, the best results are obtained by so formulating the paint composition that, expressed in mole per cent, it will fall within the following limits:

| | Mole per cent |
|---|---|
| $M_2O$ | 11.7–26.6 |
| $SiO_2$ | 42.1–62.7 |
| MO | 19.1–41.2 |

Compositions comprising zinc oxide or other reactants and sodium silicate have been described in prior publications. However, previous investigators have not defined any zone of operable limits, and any specific examples of composition of which I have knowledge fall outside the range which I have found sufficiently weather resistant to be of value in the present connection.

I have found that to obtain satisfactory results, for example on an asbestos cement shingle as ordinarily made, a very special series of operations must be followed, and the baking cycle must be closely controlled both as to rate of temperature rise and humidity in the early part of the cycle, as well as to duration and degree of the maximum temperature. Alternatively to the conditions outlined above, the shingles may be given a pretreatment by one of the means to be described hereinafter.

Asbestos shingles as ordinarily made contain approximately 85% of Portland cement and 15% of asbestos fiber. The Portland cement in hydrating frees calcium hydroxide. The shingles are stacked in tight piles for curing. As a consequence, carbon dioxide from the air has access to only the edges of the shingles. Thus, under ordinary conditions in a 28-day curing period, a band about one inch wide around the edge of each shingle is quite thoroughly carobnated, but the major portion of the area still contains high amounts of free calcium hydroxide. I have found that if a shingle containing this free lime, and having a moist surface, is coated for example with a zinc oxide-sodium silicate coating as described previously, it will upon drying develop light-colored streaks within the area that has not been carbonated by contact with the carbon dioxide of the atmosphere. No baking treatment will remove these streaks. Furthermore, I have discovered that if the shingle surface is dry when the coating is applied, the streaks will not always appear during drying or baking but will usually appear after a short period upon weather exposure, regardless of the baking conditions.

However, if I dry the surface of the shingle, apply one coat, allow it to dry sufficiently so that it loses "tackiness" and the gloss resulting from the presence of water, and then apply a second coat, I can, by properly controlling the baking conditions, obtain a hardened coating which withstands weather exposure without change over long periods. Apparently the first coat serves to react with, and thus fix, the lime. However, before the second coat is applied, the first coat should be sufficiently dry so that there is no free intermingling of the materials in the two coats. On the other hand, the first coat must not be dried by use of such sustained elevated temperatures as would promote the reaction between the zinc oxide, or other reactant, and the sodium silicate. In other words, a second coat cannot be successfully applied over a baked or substantially reacted first coat. The first coat should not be subjected to a temperature of more than 200° F., and this temperature should not be held more than the time required to remove the free water from the composition.

In actual practice, I pass the material, such as asbestos Portland cement shingles to be treated, on a cable conveyor through a heated tunnel in which the shingles acquire a temperature of from about 100° F. to 150° F., whereby also any moisture is removed from the surface of the shingles. The warm shingles are then carried under sprays where the first coat of coating composition is applied. The heat contained in the shingles causes the first coat thus applied to set up in about two minutes, becoming dry to the touch.

I have found that attempts to thus dry the first coat by application of heat to the coated shingle usually cause blisters by expansion of tiny entrained air bubbles. By preheating the shingles before the application of the coating, the air expands and breaks free while the coating will still flow and thus heal any openings. The shingles on the conveyor, after the drying interval, pass under a second spray booth in which they receive the second coat of composition.

The coated shingles are then ready to be baked for the purpose of rendering the coating weather-resistant. I have found that this operation calls for special conditions not mentioned nor appreciated by previous investigators. In the first place, coated shingles cannot be placed immediately into a zone of high temperature without developing blisters, because of the expansion of entrained air or development of steam in the second coat. In practice, a temperature of 120° F. has been found to be about the limit to which freshly coated shingles can be subjected. Furthermore, the temperature rise in the oven should not be so rapid that the boiling point of water is reached before the free water in the coating is removed. In practice, this rate has been found to be about 4° F. to 6° F. per minute. Furthermore, I have found that on a base containing lime in substantial quantities, as in an untreated shingle, it is essential that the humidity in the baking oven be held at a high value unless the final baking temperature is to exceed 370° F. When a final temperature of 370° F. is exceeded, high humidity is beneficial, but not essential, to the production of a weather-resistant coating. However, I prefer to bake at temperatures below 370° F. because of economy in fuel and because of the fact that at 370° F. the shingle stock may at times be considerably warped. The lowest temperature which will give a reasonably satisfactory shingle is 250° F. The time during which the top temperature must be maintained varies in inverse order with the final temperature.

From the observations I have made in experiments, I have evolved a theory to account for the behavior of the coating under various baking conditions on an alkaline base. However, I do not wish to be limited by this theory, since in any event my discovery has led to new and unexpected results. I believe that in the presence of lime, sodium silicate is immediately precipitated as a sodium calcium silicate, but that the resulting compound is less stable than complex sodium zinc silicate. Therefore, if conditions of mobility are maintained, the complex sodium zinc silicate slowly forms and replaces the calcium. The condition of mobility is maintained in the baking operations at lower temperatures by holding the vapor pressure in the oven in the early part of the cycle above the vapor pressure of loosely bonded water in the reaction products of the coating. After maintaining the humid conditions for a sufficiently long period for the calcium displacement to take place, the product is rendered insoluble by dehydration in a dry atmosphere.

At the higher temperatures, mobility is apparently obtained by molecular activity, and the high humidity in the early part of the cycle is not so important. However, aside from the weather resistance of the coating, it is desirable that the humidity be held at a high value, since the coating becomes impervious to moisture on drying and the rapid drying from one side may result in warping of the shingle stock.

In the higher temperature baking operations the duration of the final temperature can be shorter because of the faster rate of dehydration.

Those baking operations which depend upon the prescence of humidity for completion of the initial reaction must be carried out at a slower rate to allow time for the reaction to take place. In practice I have maintained high humidities in the early part of the baking cycle by heating moist shingles in an indirectly heated oven in which humidity conditions can be controlled. During the dehydrating period the moisture is removed from the oven by well-known means. Typical satisfactory baking cycles using various final temperatures have been as follows:

*For 300° F. final temperature*

| Elapsed time, minutes | Dry bulb temperature | Dew point |
|---|---|---|
| | Degrees | Degrees |
| 0 | 100 | (¹) |
| 15 | 125 | 91 |
| 30 | 150 | 106 |
| 45 | 175 | 120 |
| 60 | 200 | 131 |
| 75 | 225 | 140 |
| 90 | 250 | 142 |
| 105 | 275 | 135 |
| 120 | 300 | 125 |
| 135 | 300 | 110 |
| 150 | 300 | 98 |
| 165 | 300 | 88 |
| 180 | 300 | 85 |
| 195 | 300 | 82 |
| 210 | 300 | 80 |
| 225 | 300 | 79 |
| 240 | 300 | 77 |
| 255 | 300 | 76 |
| 270 | 300 | 75 |
| 285 | 300 | 74 |
| 300 | 300 | 73 |

¹ That of outside air.

*For 340° F. final temperature*

| Elapsed time, minutes | Dry bulb temperature | Dew point |
|---|---|---|
| | Degrees | Degrees |
| 0 | 100 | (¹) |
| 15 | 130 | 93 |
| 30 | 160 | 112 |
| 45 | 190 | 125 |
| 60 | 220 | 134 |
| 75 | 250 | 139 |
| 90 | 280 | 135 |
| 105 | 310 | 120 |
| 120 | 340 | 100 |
| 135 | 340 | 90 |
| 150 | 340 | 85 |
| 165 | 340 | 80 |
| 180 | 340 | 78 |
| 195 | 340 | 75 |
| 210 | 340 | 73 |

¹ That of outside air.

*For 370° F. final temperature*

| Elapsed time, minutes | Dry bulb temperature | Dew point |
|---|---|---|
| | Degrees | Degrees |
| 0 | 70 | (¹) |
| 15 | 107 | 84 |
| 30 | 145 | 84 |
| 45 | 182 | 84 |
| 60 | 220 | 84 |
| 75 | 257 | 84 |
| 90 | 295 | 84 |
| 105 | 332 | 84 |
| 120 | 370 | 84 |
| 135 | 370 | 80 |
| 150 | 370 | 77 |
| 165 | 370 | 74 |
| 180 | 370 | 73 |

¹ That of outside air.

It will be noticed that in the case of this 370° F. baking operation the humidity was not carried to a high figure in any part of the cycle. The dew points shown resulted from the combustion products in a gas fired oven in which recirculation was maintained for most economical heating. The lower dew point at the end of the operation reflects only a change in the amount of recirculating air present to permit further dehydration of the coating.

I have conducted baking operations at a final temperature of 400° F. in which it was necessary to hold the top temperature for only 30 minutes. At temperatures above approximately 450° F. I have found it unnecessary to prolong the heat cycle and can dispense with further heating.

As an alternative to closely controlling the baking cycle, I have found that I can overcome the tendency of the coating to fail on weather exposure by neutralizing the free lime, formed by the hydration of the Portland cement, in any of several ways. Thus if the shingles to be coated are placed in a closed chamber with the face of each shingle exposed to the atmosphere and are allowed to absorb carbon dioxide in quantities of approximately 55 lbs. or more per 1000 sq. ft., I can obtain a satisfactory coating by baking the coated shingles in a cycle, including raising the temperature from ordinary room temperature to 300° F. in 45 minutes and then maintaining a temperature of 300° F. for 3 hours. No special control of humidity is then necessary.

Or I may dip the shingle stock in, or give it a flooding spray of, dilute sodium silicate (about 1 part of 40° Bé. silicate to 9 parts of water) and apply the coating on the following day. The baking operation can then be conducted as above outlined for the carbonated shingles.

Another means of rendering the lime inactive, particularly in the case of dry-process asbestos Portland cement shingles, is to include fine silica in the composition of the shingle stock in quantities sufficient to react with the free lime when the shingles are subjected to autoclaving with steam. The quantity of silica is usually about 50% of the weight of the cement, and a steam pressure of 100 lbs. per sq. in. for about 7 hours will carry the reaction to completion.

In those cases in which shingles are pretreated, I can successfully produce a satisfactory weather-resistant coating by application of a single coat of my coating composition.

It will be obvious from the example cited above that any method of treatment which will remove the calcium hydroxide or convert it into a calcium compound which will have a solubility product of less than $1.0 \times 10^{-7}$ will function in overcoming the difficulites of faulty weather resistance of the coating eventually to be applied. Thus, the shingles might be dipped in sodium carbonate solution with a subsequent wash to remove the by-product, sodium hydroxide, or they might be subjected to a leaching to remove dissolved calcium hydroxide. All such treatments are within the scope of this invention.

I have found that improperly coated shingles usually fail on exposure to weather, exhibiting a change in color which results in a blotched appearance. By carefully checking experimental shingles exposed to outdoor weather against samples tested by accelerated methods, I can determine within a very short time by simple tests whether a coated shingle will satisfactorily withstand outdoor exposure.

I have also found that porous bodies coated with this composition, and particularly when the base contains Portland cement or other hydraulic siliceous cements as a binder therein, have a tendency to shrink during the processing and later to expand when exposed to the weather. Under conditions of actual use, the force of expansion frequently causes buckling or breakage, or may tear the shingles from their fastening means. To overcome this tendency, I have found it necessary to restore a sufficient amount of moisture to the shingles to normalize their moisture content to that ordinarily prevailing under atmospheric conditions. This amount is approximately between 5% and 8%, depending upon the humidity present in the air. Sheets containing approximately 6% of moisture will not change substantially in dimensions even with additional moisture or even when wetted as by rain, or when completely saturated with water. Sheets containing from 5% to 8% of moisture are substantially normalized within approximately 24 hours after the addition of the moisture. The moisture can be added in any convenient manner, as by dipping, spraying, humidification in closed chambers, etc. I have also found that the addition of such moisture adds flexibility to the coated stock and permits the removal of any strains or warp that may have been created in the base during the treating process.

A very satisfactory manner of reintroducing moisture into the baked shingles is by actually dipping them into water. A convenient way is to pass them on a traveling belt through a trough of water, so correlating the speed of the belt that the shingles remain submerged about two or three minutes, which usually suffices to permit them to absorb the required amount of water. The thus treated shingles exhibit a decided warp after this treatment, but on being stacked up they soon become equalized as to their moisture content and then become perfectly flat. When subsequently packed, they remain flat, because they are then substantially in equilibrium with the air as to moisture content. This remoistening step is very important in producing a good product.

It is, of course, obvious that the present process is applicable to any type of cementitious, clay, or ceramic product capable of holding the applied coating and which is of such a nature as to withstand the baking conditions; and while the invention has found particular application to the asbestos-cement shingle art, it is not intended to limit it thereto. The manner of making the shingles is also of no particular moment, and either the so-called Hatschek or Norton method may be used for their manufacture.

What is claimed as new is:

1. Process of producing a weather-resisting coated asbestos-cement article which comprises applying to at least one surface thereof a flowable coating composition comprising an aqueous solution of an alkali metal silicate and a therewith reactable water-insoluble compound of a divalent metal from the group consisting of zinc oxide, calcium carbonate, magnesium carbonate and high-burned magnesium oxide, and drying and baking the coated article at a temperature between about 250° F. and 450° F. until the reaction between the constituents of said coating composition is substantially completed; said composition having a formula which expressed in terms of mole percent of its constituents is substantially as follows:

| | Mole per cent |
|---|---|
| $M_2O$ | 11.7–26.6 |
| $SiO_2$ | 42.1–62.7 |
| MO | 19.1–41.2 |

(the total in any case equalling 100%) and in which $M_2O$ represents an alkali metal oxide, $SiO_2$ silicon dioxide, and MO the oxide of a divalent element of the stated group.

2. The process of claim 1 in which the element whose oxide is represented in the formula by MO is zinc.

3. The process of claim 1 in which any free calcium hydroxide on the surface of the cement article is neutralized before application of the coating composition.

4. The process of claim 1 in which any free calcium hydroxide on the surface of the cement article is neutralized by means of carbon dioxide before application of the coating composition.

5. The process of claim 1 in which any free calcium hydroxide on the surface of the cement article is neutralized by means of sodium silicate before application of the coating composition.

6. The process of claim 1 in which any free calcium hydroxide on the surface of the cement article is neutralized by means of free silica and the action of steam under superatmospheric pressure before application of the coating composition.

7. A coated weather-resisting asbestos-cement article having a coating comprising the reaction-products of an alkali metal silicate and a therewith reactable water-insoluble compound of a divalent metal from the group consisting of zinc oxide, calcium carbonate, magnesium carbonate and high-burned magnesium oxide; said coating having a formula which expressed in terms of mole percent of its constituents is substantially as follows:

| | Mole per cent |
|---|---|
| $M_2O$ | 11.7–26.6 |
| $SiO_2$ | 42.1–62.7 |
| MO | 19.1–41.2 |

(the total in any case equalling 100%) and in which $M_2O$ represents an alkali metal oxide, $SiO_2$ silicon dioxide, and MO the oxide of a divalent element of the stated group.

8. A coated weather-resisting asbestos cement article as claimed in claim 7, in which the element whose oxide is represented in the formula by MO is zinc.

9. The process of producing weather resistant coated asbestos cement building elements, which comprises preheating said elements to about 100°–150° F., applying to at least one surface a liquid coating composition comprising a suspension of a compound selected from the group consisting of zinc oxide, calcium carbonate, high burned magnesium oxide, and magnesium carbonate, in an alkali silicate solution, in which the proportions of $M_2O:SiO_2:MO$ are substantially within the limits, respectively, of 11.7–26.6:42.1–62.7:19.1–41.2 mole per cent (the total in any given case equalling 100), and wherein $M_2O$ represents the alkali metal oxide constituent of the silicate, and MO represents the oxide of a divalent metal of said compound, permitting the thus produced coating to become dry to the touch; then applying a second coating of the same composition, and passing the coated elements through a heating zone in which the rate of heat input into the elements is so adjusted as to cause a rise in temperature of not substantially greater than about 6° F. per minute, with an upper limit of temperature not substantially above 450° F., maintaining the selected maximum temperature for not less than about 30 minutes, and not substantially more than 120 minutes; and finally cooling the elements.

10. A weather resistant coated cementitious structural element having a weather-resistant inorganic coating thereon characterized by its ability to resist weathering for a long period of time, said coating being formed by preheating the building elements to about 100°–150° F., applying to a surface of the cementitious building element a liquid coating composition comprising a suspension of a compound selected from the group consisting of zinc oxide, calcium carbonate, high burned magnesium oxide, and magnesium carbonate, in an alkali silicate solution, in which the proportions of $M_2O:SiO_2:MO$ are substantially within the limits, respectively, of 11.7–26.6:42.1–62.7:19.1–41.2 mole per cent (the total in any given case equalling 100), and wherein $M_2O$ represents the alkali metal oxide constituent of the silicate, and MO represents the oxide of the divalent metal of said compound, the surface of the building elements being preheated to about 100° F.–150° F., permitting the thus produced coating to become dry to the touch; then applying a second coating of the same composition, and passing the coated elements through a heating zone in which the rate of heat input into the elements is so adjusted as to cause a rise in temperature of not substantially greater than about 6° F. per minute, with an upper limit of temperature not substantially above 450° F., maintaining the selected maximum temperature for not less than about 30 minutes, and not substantially more than 120 minutes; and finally cooling the elements.

11. The process of coating asbestos-cement building elements which comprises applying to at least one surface thereof a liquid coating composition comprising a suspension of zinc oxide in a sodium silicate solution in which the ratio of $Na_2O$ to $SiO_2$ is about as 1:3.22, the amount of ZnO being so chosen that in the resulting composition the relative ratio of $Na_2O:SiO_2:ZnO$ by weight is, respectively, within the range of 10.5–25.5:37.0–58.0:24.0–48.5 (the total in any given case equaling 100), the surface of the building element being preheated to about from 100° F.–150° F., permitting the thus produced coating to become dry to the touch; then applying a second coat of the same composition and passing the coated elements through a heating zone in which the rate of heat-input into the elements is so adjusted as to cause a rise in temperature of not substantially greater than about 6° F. per minute, with an upper limit of temperature of not substantially above 450° F., maintaining the selected maximum temperature for not less than about 30 minutes and not substantially more than 120 minutes; and finally cooling the elements.

12. A coated weather-resistant cementitious article having a coating comprising the reaction-products of an alkali-metal silicate and a therewith reactable water-insoluble compound of a divalent metal from the group consisting of zinc oxide, calcium carbonate, magnesium carbonate and high-burned magnesium oxide; said coating being essentially formed of the above-named constituent which when calculated as oxides form a composition falling within the quadrilateral area on a

$M_2O:SiO_2:MO$ mole per cent triaxial diagram bounded by the lines connecting points on said diagram located respectively in the intersections of the lines indicating 36% MO and 21% $M_2O$; 41.2% MO and 11.7% $M_2O$;

22% MO and 16% $M_2O$; and 19.1% MO and 26.6% $M_2O$;

(the total mole per cents of $M_2O$, $SiO_2$ and MO in the composition in any case equalling 100%), and on the diagram $M_2O$ represents an alkali metal oxide, $SiO_2$ silicon dioxide, and MO the oxide of the divalent metal of the above recited group.

13. A coated weather-resistant cementitious article having a coating comprising the reaction-products of sodium silicate and zinc oxide, said coating being essentially formed of the above-named constituents which when calculated as oxides form a composition falling within the quadrilateral area on an

$Na_2O$—$SiO_2$—$ZnO$ weight per cent triaxial diagram bounded by the lines connecting points on said diagram located respectively in the intersections of the lines indicating 44% ZnO and 19.7% $Na_2O$; 48.5% ZnO and 10.5% $Na_2O$;

26% ZnO and 15% $Na_2O$; and 24% ZnO and 25.5% $Na_2O$;

the total per cents by weight of $Na_2O$, $SiO_2$ and ZnO in the composition in any case equalling 100%.

CLYDE C. SCHUETZ.